(12) United States Patent
Vikström et al.

(10) Patent No.: US 12,409,900 B2
(45) Date of Patent: Sep. 9, 2025

(54) AUTOMATIC PULL TESTS FOR ARTICULATED VEHICLES

(71) Applicant: Volvo Truck Corporation, Gothenburg (SE)

(72) Inventors: Anders Vikström, Gothenburg (SE); Leon Henderson, Härryda (SE); Carl-Johan Rundqvist, Alingsås (SE)

(73) Assignee: Volvo Truck Corporation, Gothenburg (SE)

( * ) Notice: Subject to any disclaimer, the term of this patent is extended or adjusted under 35 U.S.C. 154(b) by 821 days.

(21) Appl. No.: 17/641,883

(22) PCT Filed: Sep. 17, 2019

(86) PCT No.: PCT/EP2019/074889
§ 371 (c)(1),
(2) Date: Mar. 10, 2022

(87) PCT Pub. No.: WO2021/052570
PCT Pub. Date: Mar. 25, 2021

(65) Prior Publication Data
US 2022/0324525 A1    Oct. 13, 2022

(51) Int. Cl.
*B62D 53/10* (2006.01)
*B62D 53/08* (2006.01)
*B62D 53/12* (2006.01)

(52) U.S. Cl.
CPC ......... *B62D 53/10* (2013.01); *B62D 53/0864* (2013.01); *B62D 53/12* (2013.01)

(58) Field of Classification Search
CPC .... B62D 53/10; B62D 53/0864; B62D 53/12; B60D 1/015; B60D 1/28; B60D 1/62; B60T 7/20; B60T 2260/09; B60T 17/22
See application file for complete search history.

(56) References Cited

U.S. PATENT DOCUMENTS

| | | |
|---|---|---|
| 5,273,347 A | 12/1993 | Hansson |
| 5,406,837 A | 4/1995 | Britt |
| 6,705,684 B1 | 3/2004 | Garvey |

(Continued)

FOREIGN PATENT DOCUMENTS

| | | |
|---|---|---|
| CN | 87103324 A | 11/1988 |
| CN | 102202946 A | 9/2011 |

(Continued)

OTHER PUBLICATIONS

International Search Report and Written Opinion for International Patent Application No. PCT/EP2019/074889, mailed Jun. 16, 2020, 16 pages.

(Continued)

*Primary Examiner* — Valentin Neacsu
*Assistant Examiner* — Marlon A Arce
(74) *Attorney, Agent, or Firm* — Withrow & Terranova, PLLC

(57) ABSTRACT

A method for automatically verifying a coupling between a tractor and a first trailer unit, the method comprising engaging a wheel brake on the first trailer unit, generating a propulsion torque by the tractor, determining a first coupling force between the tractor and the first trailer unit, and verifying the coupling between the tractor and the first trailer unit based on the determined first coupling force.

15 Claims, 3 Drawing Sheets

(56) References Cited

U.S. PATENT DOCUMENTS

| | | | |
|---|---|---|---|
| 10,164,392 B1* | 12/2018 | Scheim | H01R 13/745 |
| 2005/0006946 A1 | 1/2005 | Traechtler et al. | |
| 2006/0070460 A1 | 4/2006 | Knokke et al. | |
| 2008/0012695 A1 | 1/2008 | Herschell et al. | |
| 2011/0147142 A1 | 6/2011 | Standen | |
| 2014/0060296 A1 | 3/2014 | Monteil et al. | |
| 2014/0180553 A1 | 6/2014 | Eckert et al. | |
| 2015/0102583 A1 | 4/2015 | Reimer | |
| 2017/0151935 A1* | 6/2017 | Prohaszka | B60T 7/20 |
| 2018/0297573 A1* | 10/2018 | Alam | B60T 17/221 |
| 2025/0040466 A1* | 2/2025 | Brütt | G01L 5/16 |

FOREIGN PATENT DOCUMENTS

| | | | |
|---|---|---|---|
| CN | 104870274 A | 8/2015 | |
| DE | 102016220905 A1 | 4/2018 | |
| EP | 3239009 A1 | 11/2017 | |
| GB | 1134929 A | 11/1968 | |
| GB | 2053397 A | 2/1981 | |
| KR | 100806962 B1 | 2/2008 | |
| WO | 2010007407 A1 | 1/2010 | |
| WO | 2014060296 A1 | 4/2014 | |
| WO | 2016024901 A1 | 2/2016 | |
| WO | 2018035566 A1 | 3/2018 | |
| WO | 2018151881 A1 | 8/2018 | |

OTHER PUBLICATIONS

First Office Action for Chinese Patent Application No. 201980100310.1, mailed Mar. 27, 2024, 15 pages.
Intention to Grant for European Patent Application No. 19770059.4, mailed May 7, 2024, 30 pages.

* cited by examiner

AUTOMATIC PULL TESTS FOR ARTICULATED VEHICLES

This application is a 35 USC 371 national phase filing of International Application No. PCT/EP2019/074889, filed Sep. 17, 2019, the disclosure of which is incorporated herein by reference in its entirety.

TECHNICAL FIELD

The present disclosure relates to articulated vehicles comprising a tractor and one or more trailer units. There are disclosed methods and arrangements for automatic pull tests of a tractor-trailer coupling. There is also disclosed herein vehicle fleet management systems and autonomous vehicles for verifying coupling function in a fleet of trailers.

BACKGROUND

When coupling a trailer to a tractor, i.e., a towing vehicle, it is necessary to perform a "pull test" to secure that the tractor and trailer(s) are securely connected and that the brakes on the trailer are working. This is normally part of a daily inspection test carried out, e.g., by the driver, but can also be performed separately whenever needed. A purpose of such pull tests is to ensure that the pneumatic connections between towing vehicle and trailer are correctly attached, that the brakes on the trailer are fully operational and that the coupling mechanism is locked.

A manual pull test is a time-consuming task especially in case of larger articulated vehicle combinations with multiple units. The manual pull test is traditionally performed by the driver by releasing all truck brakes and applying the trailer brakes from the tractor cab either while rolling slowly or by gently accelerating when standing still until the driver can feel that the trailer is braked and firmly holds the truck in place. The driver may also need to open the pneumatic emergency shut-off valve at the rear of the last trailer to verify that compressed air flows through the whole combination.

It is desired to automate the pull-test procedure in order to increase efficiency and allow autonomous operation in general. WO 2014/060296 A1 discloses a method for automatically performing a 'trailer test function' which comprises verifying a coupling between tractor and trailer, i.e., a pull test. The disclosed method involves generating control signals to engage brakes on the trailer. The method also comprises generating positive propulsion torque by the tractor. The coupling between tractor and trailer is then verified based on using wheel speed sensors to determine that the vehicle does not move despite the applied propulsion torque.

There is, however, a need for further development of efficient and robust methods for verifying a coupling between tractor and trailer unit.

SUMMARY

It is an object of the present disclosure to provide methods for automated verification of tractor-trailer coupling. This object is obtained by a method for automatically verifying a coupling between a tractor and a first trailer unit. The method comprises engaging a wheel brake on the first trailer unit, generating a propulsion torque by the tractor, determining a first coupling force between the tractor and the first trailer unit, and verifying the coupling between the tractor and the first trailer unit based on the determined first coupling force.

This way an efficient and robust method for verifying a coupling between tractor and trailer unit is provided. By determining coupling force, it is robustly verified that the mechanical linkage between tractor and trailer is operational. Thus, both braking capability and mechanical linkage is verified by the proposed method. The method is applicable to any type of wheel brake, including both service brakes and parking brakes.

If the coupling verification fails, a status signal may be generated indicating the failed coupling verification result. If the coupling verification is successful, another status signal may be generated indicating the successful coupling verification result. Also, the method may comprise preventing a tractor operation in case the status signal indicates unverified coupling and/or a coupling fault, meaning that only vehicle combinations with successfully verified coupling may be permitted to leave a stationary or parked state.

According to aspects, the method also comprises verifying a coupling between a dolly and a second trailer unit by engaging a wheel brake on the second trailer unit, generating a propulsion torque via the dolly or by the dolly, determining a second coupling force between the dolly and the second trailer unit, and verifying the coupling between the dolly and the second trailer unit based on the determined second coupling force.

This means that multi-vehicle combination couplings can be verified by the proposed methods, which is an advantage. The propulsion torque may be transferred to the trailer from a tractor via the dolly, or it can be generated directly in the dolly by, e.g., one or more electric motors or the like. Stand-alone 'pre-trip inspection vehicles' are also disclosed herein and will be discussed in more detail below.

According to aspects, the method comprises determining the first and/or the second coupling force based on a force sensing bearing arranged in connection to a fifth wheel coupling between the tractor and the first trailer unit and/or between the dolly and the second trailer unit, respectively. The force sensing bearing offers a cost-efficient, robust and convenient way to determine coupling force.

According to aspects, the method comprises monitoring a suspension system level in any of; the tractor, the first trailer unit, the dolly, and/or the second trailer unit, and verifying the coupling between the tractor and the first trailer unit also based on the suspension system level and/or verifying the coupling between the dolly and the second trailer unit also based on the suspension system level in response to the propulsion torque.

The idea is that when parts of the suspension are 'pulled down' or 'pushed up' due to kinematics in the suspension geometry, this could be detected using level sensors, which are commonly found in air suspension systems. The coupling between vehicle units can then be verified based on the output from the level sensors. Pressure sensors can also be used which indicate pressure changes due to compression of air suspension elements during the pull test. In other words, according to aspects, the suspension system level is monitored by one or more level sensors arranged to measure a vertical deflection of the suspension, and/or one or more pressure sensors arranged to measure compression of an air suspension element of the suspension system.

It is an advantage that the level sensors and/or pressure sensors can be used in combination with the force sensing bearing or bearings, providing some redundancy and increasing robustness.

According to aspects, generating a propulsion torque by the tractor or generating a propulsion torque via or by the dolly comprises estimating propulsion force by monitoring an engine torque and/or a wheel speed of the tractor or dolly, respectively. This way it can be ascertained that propulsion force is actually generated in sufficient amount during the automated pull-test, which further increases robustness of the proposed methods.

There is also disclosed herein a pre-trip inspection vehicle arranged to autonomously verify coupling function in a fleet of trailers units. The pre-trip inspection vehicle comprises a control unit arranged to generate control signals to; maneuver the pre-trip inspection vehicle to a stationary trailer or to a stationary trailer combination; engage a wheel brake on the stationary trailer; generate a propulsion torque by a power source comprised in the pre-trip inspection vehicle; determine a first coupling force between the stationary trailer and the pre-trip inspection vehicle, and; verify coupling function in the stationary trailer based on the determined first coupling force.

This way one or more stationary trailers, e.g., trailers parked at some cargo terminal or parking facility, can be autonomously verified by the pre-trip inspection dolly. Faulty trailers can then be detected and serviced in an efficient manner. Interruption in operations due to faulty trailers can be avoided or at least alleviated.

According to some aspects, the pre-trip inspection vehicle may be arranged to supply compressed air to the stationary trailer, and/or to release/apply a parking brake of the stationary trailer, and/or to electrically charge the stationary trailer, and/or to read one or more fault codes from the stationary trailer.

Thus, the pre-trip inspection vehicle may be configured to also service stationary trailers and to test the trailers for other faults not directly related to coupling verification. Any faults discovered can be reported to service personnel and/or to a control center.

According to some aspects, the pre-trip inspection vehicle comprises a wireless transceiver unit configured to establish a wireless link to a remote server for exchanging messages between inspection vehicle and remote server.

The wireless link may, e.g., be used for transmission of a coupling verification result and/or a trailer status data message to the remote server indicating a current functional state of the stationary trailer. This way the remote server is able to monitor the status of a parked fleet of trailers.

The pre-trip inspection vehicle may comprise any of a fifth wheel connection and/or a hitch point connection. This allows the pre-trip inspection vehicle to interface with both semitrailer vehicles and other trailer vehicles.

There are also disclosed herein control units, vehicles, remote servers, computer program products, and systems for verifying trailer function associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1A:
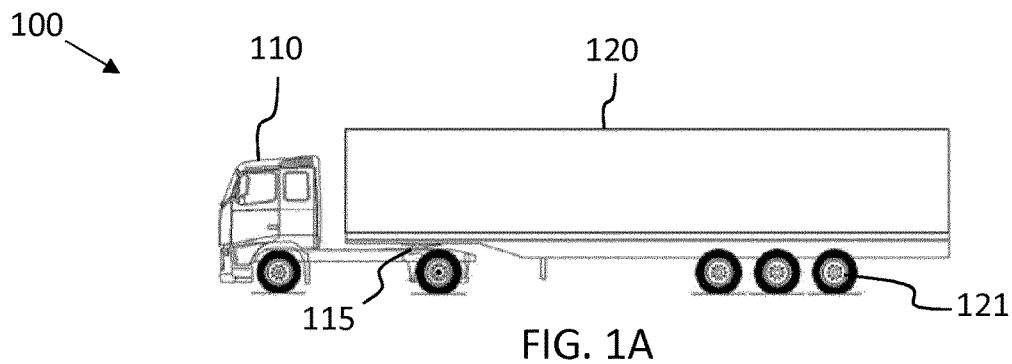
FIGS. 1A-C illustrate example vehicle combinations.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1B:
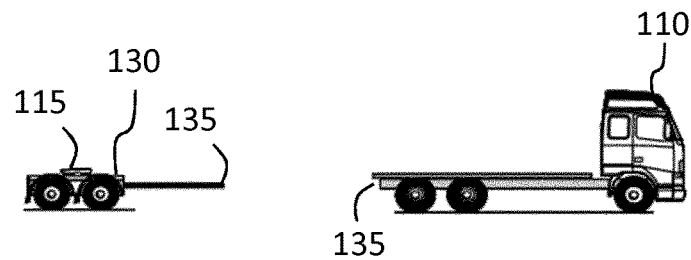
Figure 1C:
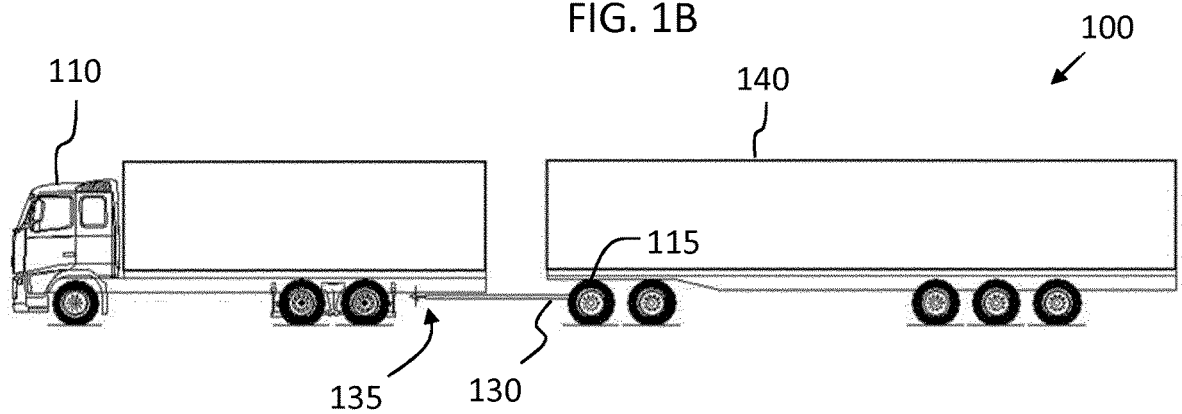

FIGS. 1A-1C show example vehicles and articulated vehicle combinations 100. FIG. 1A shows a tractor 110 coupled to a semitrailer unit 120 via a fifth wheel coupling arrangement 115. The wheels 121 on the trailer 120 comprise brakes which can be engaged via a pneumatic and/or electric connection between the tractor 110 and trailer 120. There is also an electrical connection between the tractor 110 and the trailer 120 which supplies electrical energy for powering electrical systems such as trailer lighting. On or more parking brakes may also be present on the trailer.

An electrical connection from truck to trailer is often used by the truck to request engagement of the brakes on the trailer, i.e., the wheel brakes are often electrically controlled but pneumatically actuated. A pneumatic connection is often used to supply air to the trailer but the actual control signal is often (but not always) electrical.

FIG. 1B shows a different form of tractor 110 arranged to tow a trailer unit by a drawbar arrangement 135. A trailer unit can either be directly connected via drawbar 135 to the tractor 110, or via a dolly 130. A dolly 130 comprises a drawbar arrangement 135 for coupling with a tractor or with another trailer unit, and a fifth wheel arrangement 115 for coupling to a trailer.

FIG. 10 shows a vehicle combination where a tractor 110 is coupled to a dolly 130, which in turn tows a second trailer unit 140. The dolly 130 may here be referred to as a first trailer unit.

In general, a coupling between units in an articulated vehicle combination may comprise any combination of drawbars and fifth wheel couplings. An articulated vehicle combination may comprise more than one trailer unit, e.g., two trailer units coupled together by a dolly and towed by a tractor. Three or more trailer units are rare, but the methods disclosed herein are applicable to any number of trailer units in combination.

A pull test, as noted above, is a test to verify the coupling or couplings in an articulated vehicle combination. It is important to verify the mechanical link between the units, such that the trailer unit can be safely towed without detaching from the tractor. It is also important to verify that the pneumatic coupling between units is correct, and that the brakes on the trailer or trailers are fully functional.

There are multiple challenges that needs to be solved to achieve a fully automatic pull test functionality. According to an example of the herein disclosed techniques, the steps in an automatic pull test procedure may comprise;

A) Automatically engaging one or more brakes on the trailer. This can be achieved by utilizing an electronic brake system and electronic park brake system capability to apply/release brake pressure to the correct trailer output ports and the request can be cross-checked against pressure sensor measurements on the towed unit to confirm the connection.

B) Verifying that the trailer brakes are actually applied. This can be achieved by a pressure sensor on the towed units to confirm the brake request from the towing unit has been received properly. This is, however, not always sufficient for a safe solution since the pressure sensors typically are not mounted at the wheel end but instead before. Also, not all towed units are equipped with such pressure sensors. To further verify that brakes are applied it is proposed herein to automatically generate a positive propulsion torque, e.g., by external request to engine or other propulsion units, and then measure or estimate the resulting coupling force between truck and trailer. Coupling force may be measured using coupling force sensors arranged in connection to the coupling. The coupling force sensor may, e.g., be based on strain gauges or on a force-sensing bearing arranged in connection to a fifth wheel coupling device. A force sensing bearing is described in, e.g., US 2006/0070460 A1. It is also possible to use level sensors in the air suspension system to detect towing unit pitch movement during the pull test, which will vary depending on if the trailer brakes have been successfully engaged or not. Wheel speed sensors can also be used to determine of the wheels are moving or if the wheels are locked in position by the engaged brakes of the trailer.

It is appreciated that wheel brakes may be tested, e.g., all at once, one by one in sequence, or axle by axle. In case service brakes are to be tested, any parking brakes are first released. In case parking brakes are to be tested, the service brakes are first released. Thus, when verifying coupling, the wheel brakes to be tested are applied while other brakes on the vehicle are released prior to performing the test.

The coupling force measurement, possibly complemented by the level sensor data from the suspension system and/or from wheel speed sensors, can now be compared to predefined test criteria. Based on the outcome of the comparison, a test result can be generated. In case the test result indicates correct coupling, a signal can be issued to the driver indicating that the vehicle combination is ready for operation. In case the test is not passed for some reason, a warning signal can be issued to the driver indicating that the vehicle combination is not ready for operation, possibly complemented by a likely source of error. This warning signal may also be associated with automatically preventing vehicle operation until a successful vehicle pull test has been performed. Also, a vehicle combination may implement a function preventing operation until a successful coupling test has been performed, i.e., the pull-test has to be performed before the vehicle combination can be operated.

Figure 2:
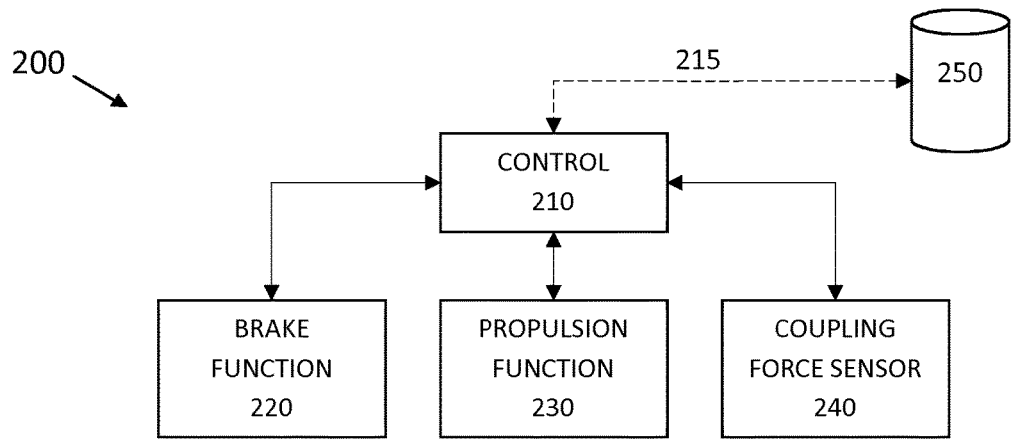
FIG. 2 schematically shows an arrangement for automated pull tests.

FIG. 2 shows an example vehicle control system 200 configured for performing an automated pull test for verifying a coupling 115, 135 in an articulated vehicle combination, such as the combinations discussed above in connection to FIGS. 1A-1C. The system comprises a control unit 210 with processing circuitry arranged to generate control signals for executing the automated pull test. The control unit 210 may be comprised in the tractor unit 110 or in a trailer unit 120, 130, 140. The control unit 210 may also be distributed over a plurality of different vehicle units, i.e., parts of the control unit 210 may be arranged in a tractor 110 and parts of the control unit may be arranged in a trailer unit 120, or in a dolly 130.

The control unit 210 will be discussed in more detail below in connection to FIG. 7.

The control unit 210 is connected to a brake function 220 of the trailer, e.g., via a wired bus or a wireless link. whereby it can engage one or more wheel brakes on the trailer unit 120. The wheel brakes may comprise both service brakes and/or parking brakes.

The control unit 210 is also in communication with a propulsion function 230 of the tractor and is therefore able to generate a propulsion torque by the tractor 110 by issuing control commands to the propulsion function. The control unit 210 is furthermore connected to a coupling force sensor 240 arranged to determine a coupling force between the tractor 110 and the trailer unit 120. This way the control unit 210 can monitor coupling force generated at the coupling point in response to the applied propulsion torque. In case the brakes are correctly applied, an increase in coupling force is expected. If the brakes are not functional, i.e., if the brakes do not engage in response to the control signal, then the expected increase in coupling force is not seen, or will at least not be as large. Thus, the control unit 210 is arranged to verify the coupling between the tractor 110 and the trailer unit 120 based on the determined first coupling force.

The coupling force measurement may be complemented by, e.g., level sensors in a suspension system, and/or by wheel speed sensors.

It is appreciated that, normally, all wheel brakes on the trailer unit 120 are engaged, not just a single wheel. According to some aspects wheel brakes on a single axle are engaged, and the wheel brakes on the trailer unit 120 are then tested axle by axle.

It is also appreciated that the stationary trailer may comprise both service brakes and parking brakes. The techniques disclosed herein are applicable to both types of brakes. I.e., the control unit 210 is arranged to apply and to release both service brakes and parking brakes in sequence or in combination. If a parking brake is to be tested separately from a service brake, then the service brake is of course released prior to testing the parking brake. If a service brake is to be tested separately from a parking brake, then the parking brake is of course released prior to testing the service brake. The methods disclosed herein may thus comprise releasing one or more other wheel brakes prior to generating propulsion torque.

A driver of an articulated vehicle may initiate an automatic pull test routine, e.g., by selecting the operation from an interface of the tractor 110, whereby the control unit 210 executes the pull test. The result of the test can then be reported back to the driver.

The control unit 210 may also be used in an autonomous vehicle for automatically executing pull tests. An autonomous vehicle of course has no driver which can manually perform the pull test or parts of the pull test. The techniques discussed herein are therefore particularly suitable for use with autonomous vehicles. The autonomous vehicle is then maneuvered into coupling position, and coupling is attempted. The control unit 210 then verifies that the coupling is correct by performing at least some of the method steps discussed herein. In case the coupling fails to pass the test, a new coupling attempt may be made, and/or a message may be sent to a service technician. In either case the autonomous vehicle will not be allowed to tow the trailer until the vehicle combination passes the automatic coupling test.

The verified coupling, i.e. the coupling which is tested, may be any of the couplings in a vehicle combination, e.g., a coupling between a tractor 110 and a first trailer unit 120 or a coupling between a dolly 130 and a second trailer unit 140. A coupling between a first trailer and a dolly 130 (normally a drawbar coupling) may also be verified in this way. A sequence of couplings may also be verified in this way.

Optionally, the control unit 210 is connected 215 to a remote server 250. This coupling is preferably via wireless link and allows for exchange of status messages and instructions between the remote server 250 and the control unit 210. For instance, the control unit may report verification coupling results to the remote server 250 and/or receive instructions from the remote server relating to the coupling verification and/or to other vehicle tests.

Figure 3:
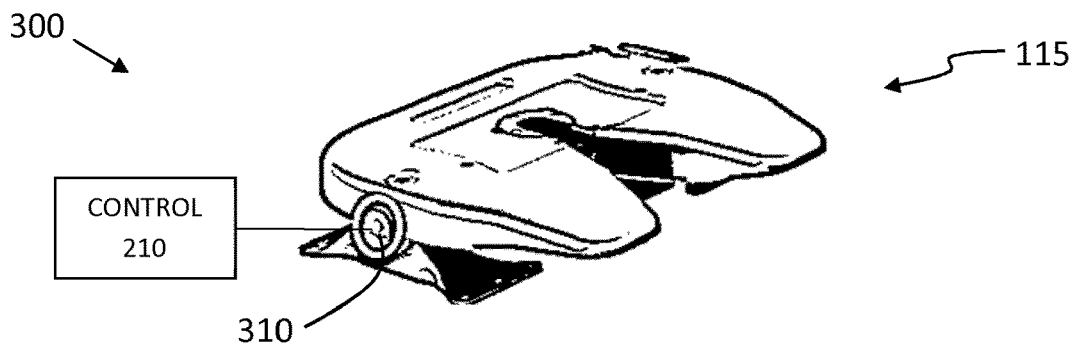
FIGS. 3-4 illustrate example coupling force sensor arrangements.

FIG. 3 shows an example fifth wheel arrangement 300. A coupling force sensor 310 is arranged in connection to a pivot point of the fifth wheel 115 where it measures coupling force. The control unit 210 is connected to the sensor 310 and is therefore able to determine coupling force in response to an applied propulsion torque as discussed above. The coupling force sensor 310 may, e.g., be based on strain gauges or on a force-sensing bearing as described in US 2006/0070460 A1. The coupling force sensor or sensors may also be based on the techniques disclosed in WO 2018/151881 A1.

Figure 4:
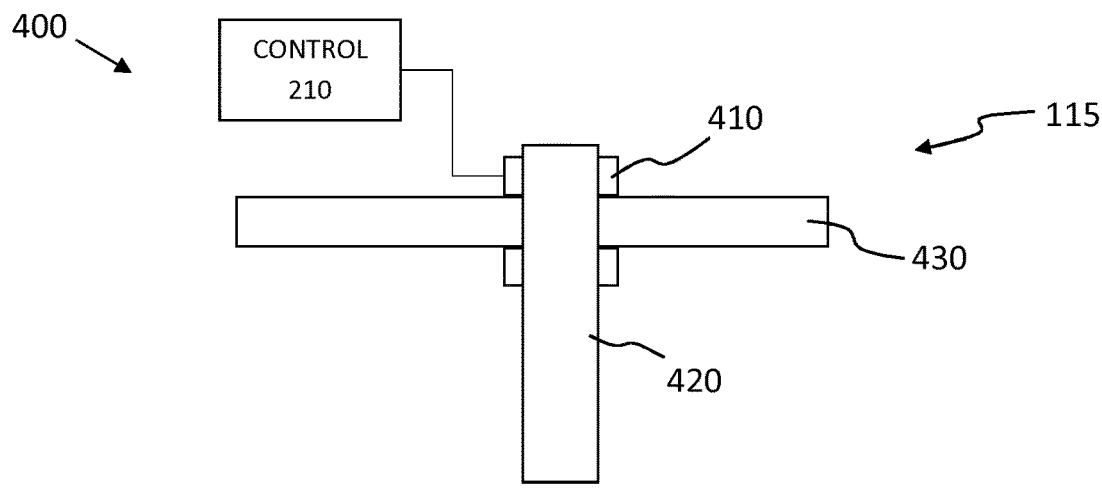

FIG. 4 shows another example fifth wheel arrangement 400. Here, a kingpin 420 is shown connected to a trailer chassis 430. A force sensing bearing, such as that described in described in US 2006/0070460 A1, is journaled about the kingpin and arranged to measure coupling force. The control unit 210 is connected to the force sensing bearing 410 and is therefore able to determine coupling force in response to an applied propulsion torque as discussed above.

Figure 5:
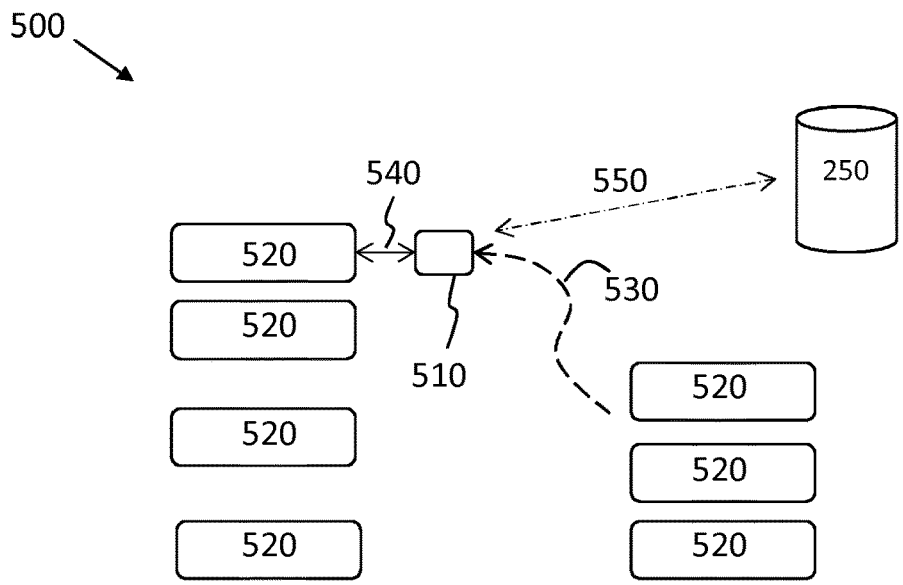
FIG. 5 shows a fleet of trailers and a pre-trip inspection vehicle.

The techniques disclosed herein can also be used for automatically verifying function in a fleet of trailers, e.g., in a parking facility or transportation terminal. FIG. 5 illustrates such a transportation facility 500 where a fleet of trailer units 520 are parked. A pre-trip inspection vehicle 510 is arranged to autonomously or semi-autonomously, i.e., at least partly via remote control, verify coupling function in the fleet of trailers units 520.

The pre-trip inspection vehicle positions itself 530 for coupling with the trailer units one after the other. Once positioned in relation to a trailer unit 520, the pre-trip inspection vehicle couples to the trailer and performs a method for automatically verifying coupling between a tractor and a first trailer unit. The pre-trip inspection vehicle 510 comprises a power source allowing it to move about and to generate the propulsion torque discussed above.

The pre-trip inspection vehicle may comprise any of a fifth wheel connection and/or a hitch point connection. Thus, according to some aspects, the pre-trip inspection vehicle comprises both a fifth wheel connection and a hitch point connection. A pre-trip inspection vehicle can then be configured to check both semitrailers and dollies (and also full trailers).

The pre-trip inspection vehicle 510 comprises a control unit 210 as discussed above, arranged to generate control signals to; maneuver 530 the pre-trip inspection vehicle 510 to a stationary trailer 520; engage a wheel brake on the stationary trailer 520; generate a propulsion torque by a power source comprised in the pre-trip inspection vehicle 510; determine a first coupling force between the stationary trailer 510 and the pre-trip inspection vehicle 510, and; verify coupling function in the stationary trailer 520 based on the determined first coupling force.

It is again appreciated that a stationary trailer 520 may comprise both service brakes and parking brakes. The pre-trip inspection vehicle may be arranged to test both types of brakes. I.e., the pre-trip inspection vehicle 510 is, according to aspects, arranged to apply and to release both service brakes and parking brakes in sequence and/or in combination.

According to aspects, the pre-trip inspection vehicle 510 is arranged to supply compressed air to the stationary trailer 520, and/or to release/apply a parking brake of the stationary trailer, and/or to electrically charge the stationary trailer 520, and/or to read one or more fault codes from the stationary trailer 520. Thus, the pre-trip inspection vehicle may be configured to perform service actions and tests other than the coupling tests discussed herein.

The pre-trip inspection vehicle 510 may also comprise a wireless transceiver unit configured to establish a wireless link 550 to a remote server 250 for exchanging messages between the dolly 510 and the remote server 250. The exchanged messages may, e.g., comprise a coupling verification result and/or a trailer status data message, and optionally also a coupling verification instruction from the remote server regarding, e.g., which trailer to test, and where the trailer is parked. The remote server 250 may also be arranged to, at least partly, control the operation of the pre-trip inspection vehicle. The remote server may, e.g., control the pre-trip inspection vehicle 510 to move into the coupling position 530.

For instance, the pre-trip inspection vehicle may be configured to check for any active fault messages from, e.g., electrical systems on the trailer—if there is an active fault code on a trailer this could be communicated to the remote server 250. An example could be if the trailer has a tyre pressure monitoring system the pre-trip inspection vehicle could read if there are any low-pressure warnings.

The remote server 250 may be configured to receive and to store a coupling verification result from the pre-trip inspection vehicle 510, wherein the coupling verification result indicates a coupling function associated with a stationary trailer 520 in a fleet of trailers. The remote server 250 is optionally configured to transmit a coupling verification instruction to the pre-trip inspection vehicle 510.

Figure 6:
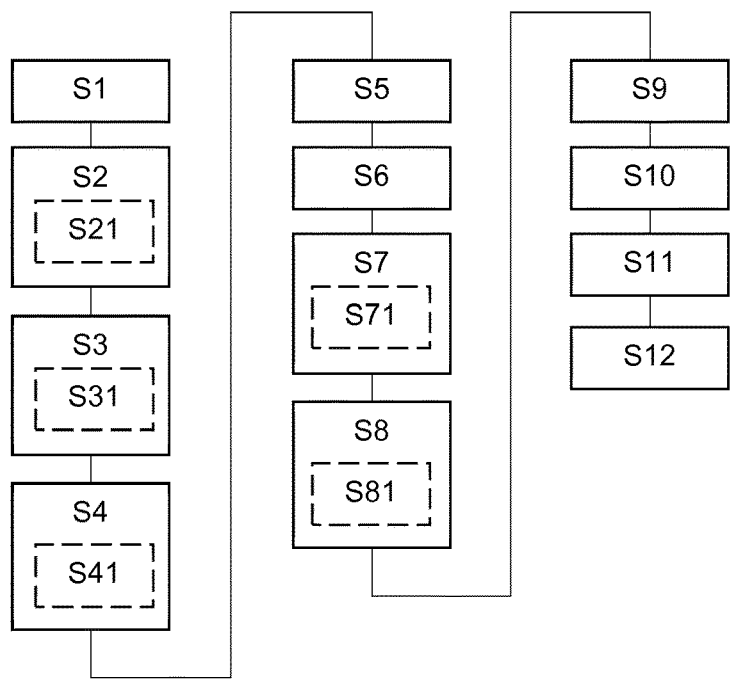
FIG. 6 is a flow chart illustrating methods.

FIG. 6 shows a flow chart which summarizes the methods discussed above, i.e., a method for automatically verifying a coupling 115, 135 between a tractor 110 and a first trailer unit 120. The method comprises engaging S1 a wheel brake on the first trailer unit 120, generating S2 a propulsion torque by the tractor 110, determining S3 a first coupling force between the tractor 110 and the first trailer unit 120, and verifying S4 the coupling 115, 135 between the tractor 110 and the first trailer unit 120 based on the determined first coupling force.

The method optionally also comprises generating S11 a status signal indicating a coupling verification result. The status signal may, e.g., be forwarded to the cabin of the tractor, where the driver is notified of the coupling status. If the coupling verification fails, the driver can take suitable action. Also, optionally, the method comprises preventing S12 a tractor operation in case the status signal indicates un-verified coupling and/or a coupling fault.

The method can optionally be extended to also comprise verifying a coupling 115, 135 between a dolly 130 and a second trailer unit 140, by engaging S5 a wheel brake on the second trailer unit 140, generating S6 a propulsion torque via or by the dolly 130, determining S7 a second coupling force between the dolly 130 and the second trailer unit 140, and verifying S8 the coupling 115, 135 between the dolly 130 and the second trailer unit 140 based on the determined second coupling force.

The propulsion torque may be generated in the tractor unit (for instance) and just passed through the dolly via its mechanical connection to the trailer unit. The propulsion torque may, however, also be generated directly by the dolly.

Of course, aspects of the discussed methods can be used for verifying any combination of vehicle couplings. The couplings can be verified one after the other, i.e., first connecting one trailer unit to the tractor and verifying that coupling, then connecting another trailer unit to the first trailer unit and verifying that coupling. Alternatively, the entire articulated vehicle combination can be coupled, followed by a verification of the couplings in a single step. An increased coupling force should then be seen in all coupling in response to the generated propulsion torque. Thus, the methods disclosed herein can be extended in a straightforward manner for testing coupling in any multi-unit articulated vehicle.

In case the method is performed in some unit other than the tractor, such as a dolly 130, the method optionally comprises transmitting S9 a verification result message from the dolly to the tractor 110.

The method advantageously uses force sensing bearings to monitor coupling force, i.e., the method optionally comprises determining the first S31 and/or the second S71 coupling force based on a force sensing bearing 310, 410 arranged in connection to a fifth wheel coupling between the tractor 110 and the first trailer unit 120 and/or between the dolly 130 and the second trailer unit 140, respectively.

The coupling force may also be monitored using other types of known strain gauges or the like.

It is also possible to use level sensors in the vehicle suspension system to detect towing unit pitch movement during the pull test, which will vary depending on if the trailer brakes have been successfully engaged or not. Thus, according to some aspects, the method comprises monitoring S10 a suspension system level in any of; the tractor 110, the first trailer unit 120, the dolly 130, and/or the second trailer unit 140, and verifying S41 the coupling between the tractor and the first trailer unit also based on the suspension system level and/or verifying S81 the coupling between the dolly and the second trailer unit also based on the suspension system level in response to the propulsion torque.

The suspension system level may, e.g., be monitored by one or more level sensors arranged to measure a vertical deflection of the suspension, and/or one or more pressure sensors arranged to measure compression of an air suspension element of the suspension system.

The techniques disclosed herein may also use wheel speed sensors as disclosed in WO 2014/060296 A1.

In order to make sure that propulsion force is actually generated, and/or that propulsion force is generated in the desired amount, generating a propulsion torque by the tractor 110 or generating a propulsion torque via the dolly 130 optionally comprises estimating S21 propulsion force by monitoring an engine torque and/or a wheel speed of the tractor or dolly, respectively.

Figure 7:
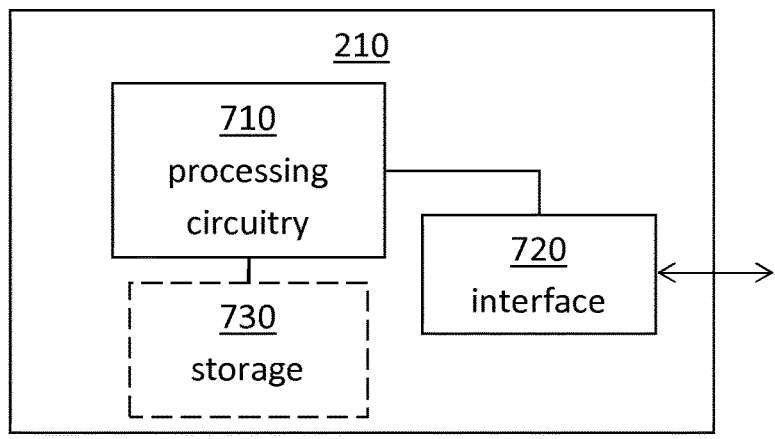
FIG. 7 schematically illustrates a control unit.

FIG. 7 schematically illustrates, in terms of a number of functional units, the components of the control unit 210 according to an embodiment. Processing circuitry 710 is provided using any combination of one or more of a suitable central processing unit (CPU), multiprocessor, microcontroller, digital signal processor (DSP), dedicated hardware accelerator, etc., capable of executing software instructions stored in a computer program product, e.g. in the form of a storage medium 730. The processing circuitry 710 may further be provided as at least one application specific integrated circuit (ASIC), or field programmable gate array (FPGA).

Particularly, the processing circuitry 710 is configured to cause the control unit 210 to perform a set of operations, or steps. These operations, or steps, were discussed above in connection to FIG. 6. For example, the storage medium 730 may store the set of operations, and the processing circuitry 710 may be configured to retrieve the set of operations from the storage medium 730 to cause the control unit 210 to perform the set of operations. The set of operations may be provided as a set of executable instructions. Thus, the processing circuitry 710 is thereby arranged to execute methods and operations as herein disclosed.

The storage medium 730 may also comprise persistent storage, which, for example, can be any single one or combination of magnetic memory, optical memory, solid state memory or even remotely mounted memory.

The control unit 210 may further comprise a communications interface 720 for communications with at least one other unit, such as the brake function 220, the propulsion function 230, the coupling force sensor 240, and the remote server 250. As such, the radar interface 720 may comprise one or more transmitters and receivers, comprising analogue and digital components and a suitable number of ports for wired or wireless communication.

The processing circuitry 710 is adapted to control the general operation of the control unit e.g. by sending data and control signals to the external unit and the storage medium 730, by receiving data and reports from the external unit, and by retrieving data and instructions from the storage medium 730. Other components, as well as the related functionality, of the control unit 210 are omitted in order not to obscure the concepts presented herein.

Figure 8:
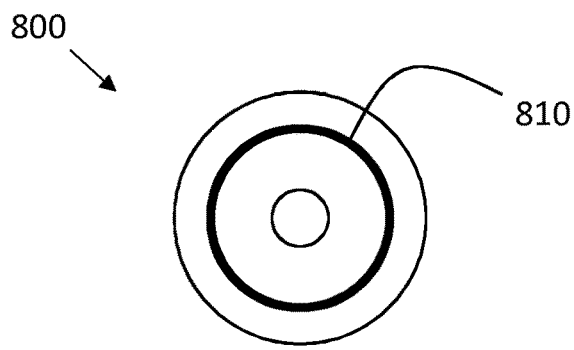
FIG. 8 schematically illustrates a computer program product.

FIG. 8 illustrates a computer readable medium 810 carrying a computer program comprising program code means 820 for performing the methods illustrated in FIG. 7, when said program product is run on a computer. The computer readable medium and the code means may together form a computer program product 800.

The invention claimed is:

1. A method for automatically verifying a coupling between a tractor and a stationary first trailer unit, the method comprising:
engaging a wheel brake on the first trailer unit,
generating a propulsion torque by the tractor,
determining a first coupling force between the tractor and the first trailer unit, and verifying the coupling between the tractor and the first trailer unit based on the determined first coupling force, verifying a coupling between a dolly and a second trailer unit by:
  engaging a wheel brake on the second trailer unit,
  generating a propulsion torque via the dolly or transferring, via the dolly, the generated propulsion torque from the tractor,
  determining a second coupling force between the dolly and the second trailer unit, and
  verifying the coupling between the dolly and the second trailer unit based on the determined second coupling force.

2. The method of claim 1, further comprising transmitting a verification result message from the dolly to the tractor.

3. The method of claim 2, further comprising determining at least one of the first and the second coupling force based on a force sensing bearing arranged in connection to a fifth wheel coupling between at least one of (i) the tractor and the first trailer unit and (ii) the dolly and the second trailer unit, respectively.

4. The method of claim 1, wherein generating the propulsion torque by the tractor, generating the propulsion torque via the dolly, or transferring, via the dolly, the generated propulsion torque from the tractor comprises estimating propulsion force by monitoring at least one of an engine torque and a wheel speed of the tractor or dolly, respectively.

5. The method of claim 1, further comprising generating a status signal indicating a coupling verification result.

6. A method for automatically verifying a coupling between a tractor and a stationary first trailer unit, the method comprising:
  engaging a wheel brake on the first trailer unit,
  generating a propulsion torque by the tractor,
  determining a first coupling force between the tractor and the first trailer unit, and verifying the coupling between the tractor and the first trailer unit based on the determined first coupling force,
  monitoring a suspension system level in at least one of the tractor, the first trailer unit, a dolly, and a second trailer unit, and at least one of (i) verifying the coupling between the tractor and the first trailer unit also based on the suspension system level and (ii) verifying the coupling between the dolly and the second trailer unit also based on the suspension system level in response to the propulsion torque.

7. The method of claim 6, wherein the suspension system level is monitored by: (i) at least one of one or more level sensors arranged to measure a vertical deflection of the suspension and (ii) one or more pressure sensors arranged to measure compression of an air suspension element of the suspension system.

8. A method for automatically verifying a coupling between a tractor and a stationary first trailer unit, the method comprising:
  engaging a wheel brake on the first trailer unit,
  generating a propulsion torque by the tractor,
  determining a first coupling force between the tractor and the first trailer unit, and verifying the coupling between the tractor and the first trailer unit based on the determined first coupling force,
  preventing a tractor operation in case the status signal indicates at least one of an un-verified coupling and a coupling fault.

9. A pre-trip inspection vehicle arranged to autonomously verify coupling function in a fleet of trailers units and arranged to supply compressed air to at least one of: a stationary trailer, to release/apply a parking brake of the stationary trailer, to electrically charge the stationary trailer, and to read one or more fault codes from the stationary trailer, wherein the pre-trip inspection vehicle comprises a control unit arranged to generate control signals to:
  maneuver the pre-trip inspection vehicle to a stationary trailer,
  engage a wheel brake on the stationary trailer,
  generate a propulsion torque by a power source comprised in the pre-trip inspection vehicle,
  determine a first coupling force between the stationary trailer and the pre-trip inspection vehicle, and
  verify coupling function in the stationary trailer based on the determined first coupling force.

10. A remote server configured to receive and to store a coupling verification result from the pre-trip inspection vehicle of claim 9, wherein the coupling verification result indicates a coupling function associated with a stationary trailer in a fleet of trailers.

11. The remote server of claim 10, configured to transmit a coupling verification instruction to the pre-trip inspection vehicle.

12. A pre-trip inspection vehicle arranged to autonomously verify coupling function in a fleet of trailers units, wherein the pre-trip inspection vehicle comprises a wireless transceiver unit configured to establish a wireless link to a remote server for exchanging messages between the inspection vehicle and the remote server, wherein the pre-trip inspection vehicle further comprises a control unit arranged to generate control signals to:
  maneuver the pre-trip inspection vehicle to a stationary trailer;
  engage a wheel brake on the stationary trailer,
  generate a propulsion torque by a power source comprised in the pre-trip inspection vehicle,
  determine a first coupling force between the stationary trailer and the pre-trip inspection vehicle, and
  verify coupling function in the stationary trailer based on the determined first coupling force.

13. The pre-trip inspection vehicle of claim 12, wherein the control unit is arranged to transmit at least one of a coupling verification result and a trailer status data message to the remote server indicating a current functional state of the stationary trailer.

14. The pre-trip inspection vehicle of claim 12, wherein the control unit is arranged to receive a coupling verification instruction from the remote server.

15. A pre-trip inspection vehicle arranged to autonomously verify coupling function in a fleet of trailers units, wherein the pre-trip inspection vehicle comprises at least one of a fifth wheel connection and a hitch point connection, wherein the pre-trip inspection vehicle further comprises a control unit arranged to generate control signals to:
  maneuver the pre-trip inspection vehicle to a stationary trailer;
  engage a wheel brake on the stationary trailer,
  generate a propulsion torque by a power source comprised in the pre-trip inspection vehicle,
  determine a first coupling force between the stationary trailer and the pre-trip inspection vehicle, and
  verify coupling function in the stationary trailer based on the determined first coupling force.

* * * * *